United States Patent
Jacob

(10) Patent No.: US 9,258,565 B1
(45) Date of Patent: Feb. 9, 2016

(54) CONTEXT MODEL CACHE-MANAGEMENT IN A DUAL-PIPELINE CABAC ARCHITECTURE

(75) Inventor: Rojit Jacob, Sunnyvale, CA (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 382 days.

(21) Appl. No.: 13/172,775

(22) Filed: Jun. 29, 2011

(51) Int. Cl.
*H04N 19/13* (2014.01)
*H04N 19/102* (2014.01)

(52) U.S. Cl.
CPC .............. *H04N 19/13* (2014.11); *H04N 19/102* (2014.11)

(58) Field of Classification Search
CPC ..... H04N 7/50; H04N 7/26244; H04N 19/13; H04N 19/102
USPC ........................................ 375/240.12; 341/51
See application file for complete search history.

(56) References Cited

U.S. PATENT DOCUMENTS

| | | | | |
|---|---|---|---|---|
| 7,095,344 B2 * | 8/2006 | Sekiguchi | ............... | H03M 7/40 341/106 |
| 7,408,488 B2 * | 8/2008 | Sekiguchi | ............... | H03M 7/40 341/107 |
| 7,535,387 B1 * | 5/2009 | Delva | .................. | H03M 7/4006 341/107 |
| 7,592,937 B1 * | 9/2009 | Chang | .................. | H03M 7/4006 341/107 |
| RE41,729 E * | 9/2010 | Sekiguchi | ............... | H03M 7/40 341/107 |
| 8,416,857 B2 * | 4/2013 | Au | ............................. | G06T 1/20 375/240.24 |
| 8,422,552 B2 * | 4/2013 | Au | ...................... | H03M 7/4006 375/240.02 |
| 8,798,139 B1 * | 8/2014 | Jacob | .................. | H03M 7/4006 375/240.02 |
| 2004/0017852 A1 * | 1/2004 | Garrido | ................ | H04N 7/0125 375/240.16 |
| 2005/0219069 A1 * | 10/2005 | Sato | ..................... | H04N 19/176 341/50 |
| 2006/0222063 A1 * | 10/2006 | Zhang | .................... | H04N 19/56 375/240.03 |
| 2007/0115154 A1 * | 5/2007 | Park | .................... | H03M 7/4006 341/51 |
| 2007/0205927 A1 * | 9/2007 | Sekiguchi | ............... | H03M 7/40 341/51 |
| 2007/0230914 A1 * | 10/2007 | Garrido | ................ | H04N 7/0125 386/264 |
| 2007/0279265 A1 * | 12/2007 | Cai | ...................... | H04N 19/647 341/61 |
| 2008/0240233 A1 * | 10/2008 | Au | ...................... | H03M 7/4006 375/240.02 |
| 2009/0092326 A1 * | 4/2009 | Fukuhara | ............. | H04N 19/139 382/233 |
| 2009/0096643 A1 * | 4/2009 | Chang | ................. | H03M 7/4006 341/51 |
| 2009/0146853 A1 * | 6/2009 | Lu | ........................ | H03M 7/4006 341/107 |
| 2009/0168868 A1 * | 7/2009 | Jahanghir | ........... | H03M 7/4006 375/240.02 |
| 2009/0196355 A1 | 8/2009 | Kao et al. | | |
| 2009/0296806 A1 * | 12/2009 | Hsu | ..................... | H03M 7/4006 375/240.01 |
| 2010/0007532 A1 * | 1/2010 | Tanaka | ................ | H03M 341/56 341/56 |
| 2010/0007534 A1 * | 1/2010 | Girardeau, Jr. | ...... | H03M 7/4006 341/107 |
| 2010/0054328 A1 | 3/2010 | Nozawa | | |
| 2010/0118971 A1 * | 5/2010 | Tanida | .................... | H03M 7/30 375/240.23 |
| 2010/0259427 A1 * | 10/2010 | Otsuka | .................... | G06T 9/005 341/107 |
| 2011/0102213 A1 * | 5/2011 | Sekiguchi | ............... | H03M 7/40 341/107 |
| 2011/0148674 A1 * | 6/2011 | Sekiguchi | ............... | H03M 7/40 341/107 |
| 2011/0228858 A1 * | 9/2011 | Budagavi | ............... | H04N 19/70 375/240.25 |
| 2011/0280314 A1 * | 11/2011 | Sankaran | .............. | G06F 9/3877 375/240.25 |

(Continued)

*Primary Examiner* — Richard Torrente
*Assistant Examiner* — Irfan Habib

(57) ABSTRACT

A method and system are disclosed for managing cache memory in a dual-pipelined CABAC encoder. A request for a context model is received from both encoder pipelines. If the requested context model is not stored in cache, the requested context model is retrieved from a context table. At least one context model stored in cache is written to the context table. The retrieved context model is updated and written to the cache. If the requested context model is stored in cache, and if the requested context model was updated in the previous clock cycle, the requested context model is retrieved from the pipeline, updated, and written to cache. If the requested context model is not stored in cache, and if the requested contest model was not updated in the previous clock cycle, the requested context model retrieved from cache, updated, and written back to cache.

25 Claims, 7 Drawing Sheets

(56) References Cited

U.S. PATENT DOCUMENTS

| | | | |
|---|---|---|---|
| 2011/0285560 A1* | 11/2011 | Chang | H04N 19/13 341/107 |
| 2011/0310958 A1* | 12/2011 | Sachdeva | H04N 19/42 375/240.02 |
| 2011/0310966 A1* | 12/2011 | Sankaran | H04N 19/159 375/240.12 |
| 2012/0022861 A1* | 1/2012 | Imthurn | H03M 7/30 704/229 |
| 2012/0057637 A1* | 3/2012 | Flachs | H04N 19/13 375/240.25 |
| 2012/0081242 A1* | 4/2012 | He | H03M 7/40 341/107 |
| 2012/0082218 A1* | 4/2012 | Misra | H04N 19/197 375/240.12 |
| 2012/0093226 A1* | 4/2012 | Chien | H04N 19/105 375/240.16 |
| 2012/0183055 A1* | 7/2012 | Hong | H04N 19/159 375/240.12 |
| 2012/0224635 A1* | 9/2012 | Kim | H04N 19/46 375/240.16 |
| 2012/0294354 A1* | 11/2012 | Sato | H04N 19/176 375/240.02 |
| 2012/0314771 A1* | 12/2012 | Lim | H04N 19/117 375/240.16 |
| 2013/0027230 A1* | 1/2013 | Marpe | H03M 7/4006 341/107 |
| 2013/0272373 A1* | 10/2013 | Wong | H04N 19/00 375/240.01 |
| 2013/0272377 A1* | 10/2013 | Karczewicz | H03M 7/30 375/240.02 |

\* cited by examiner

CONTEXT MODEL CACHE-MANAGEMENT IN A DUAL-PIPELINE CABAC ARCHITECTURE

BACKGROUND

1. Field of Art

The disclosure generally relates to video compression, and more particularly, to implementing a cache management scheme in a context-adaptive binary arithmetic coding (CABAC) encoder with a dual-pipeline architecture in a video processing system.

2. Description of the Related Art

The H.264 video coding standard includes several algorithmic improvements upon previous block-oriented motion-compensation-based video codecs. One such improvement is the availability of multiple advanced entropy coding methods, such as CABAC encoding. CABAC is a high density implementation of entropy encoding, and is based on the key elements of binarization, context modeling and binary arithmetic coding. The usage of arithmetic coding and adaptive codes permits CABAC adaptation to non-stationary symbol statistics. Context modeling is applied to a binary sequence of the syntactical elements of the video data, such as block types, motion vectors, and quantized coefficients. Context modeling allows previously coded syntax elements to be used in estimating conditional probabilities, which in turn may be used in switching between estimated probability models to improve entropy coding efficiency.

The context models in CABAC are adaptive, and change over time depending on the values of received bins to be encoded. As context models are adapted for future use, updated context models must be stored during periods of non-use. As a result, context tables may be implemented in a CABAC encoder, typically with a single I/O-port memory. Single I/O port memories are limited in operation to either one memory read or one memory write in a given clock cycle, but not both. Thus, if a context table memory receives a context model read request and write request in the same clock cycle, a stall must be inserted in the CABAC encoder pipeline to accommodate both requests. This results in an increase in encoding latency, decreasing overall CABAC and H.264 performance.

The problem is compounded in dual-pipeline CABAC architectures, where each pipeline encodes a received bin in a given clock cycle. In such architectures, each pipeline may request a context model and may produce an updated context model in a given clock cycle. Two pipelines each requesting a context memory read and write may result in up to four context table access operations in one clock cycle, requiring as many as three pipeline stalls per operation. Without efficient context model management, this may decrease CABAC and H.264 performance by up to 75%.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

H.264 Video Encoder Overview

Figure 1:
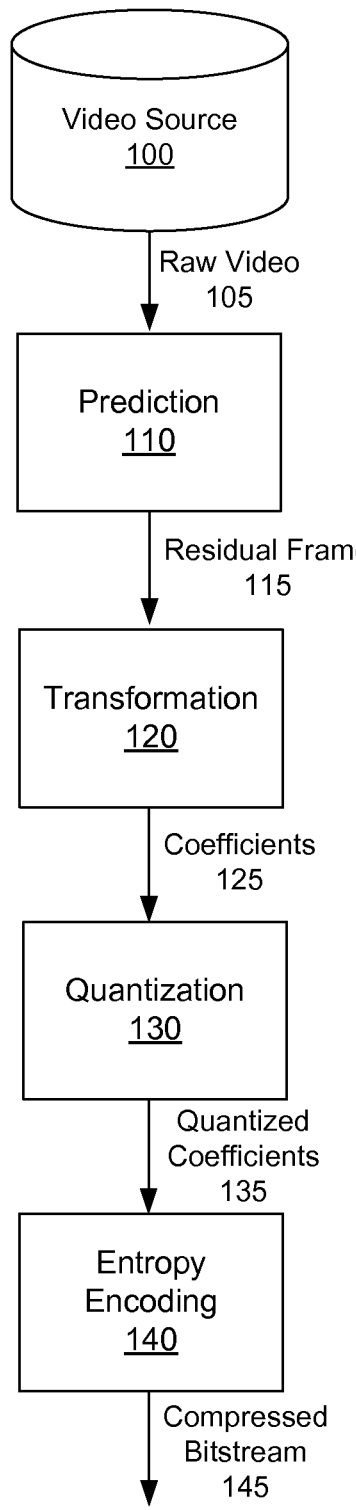
FIG. 1 is a high-level flow chart illustrating a method of encoding video data using an implementation of an H.264 video encoder according to one embodiment.

FIG. 1 is a high-level flow chart illustrating a method of encoding video data using an implementation of an H.264 video encoder according to one embodiment. Generally, an H.264 encoder receives raw video data 105 from a video source module 100 and performs the steps of prediction 110, transformation 120, quantization 130, and entropy encoding 140. The video source module 100 may comprise a computer hard drive, computer memory, flash memory card, or any other means of storing digital video data. The video source module 100 may be local to the H.264 video encoder, or may be external and accessible over a network. The modules performing prediction 110, transformation 120, quantization 130 and entropy encoding 140 as well as the video source 100 may be implemented in a single module or device, or may be implemented in multiple modules or devices. In addition, the functionalities of these modules may be implemented in fewer or additional modules than the ones shown in FIG. 1. Additional functionalities not shown may also be implemented in an H.264 encoder.

Raw video data 105 is transmitted from the video source 100 to a prediction module 110. Raw video data 105 may be video data is any format, whether uncompressed, previously compressed, or otherwise. The raw video data 105 may comprise information describing the video's general display characteristics (such as the video's size, length, resolution, or screen proportions), information describing the video's frame-specific display characteristics (such as pixel color information, pixel location information, brightness, opacity, block and macroblock dimensions and frame location, or any other pixel-domain information), or meta-data describing the video (such as the video title, publisher, publishing date, or keywords describing categorical characterizations of the video content). Raw video data 105 may be in frame format, comprising one or more plurality of still images each composed of pixel information, which when displayed consecutively form motion video.

Prediction module 110 receives one or more frames of raw video data 105 and produces one or more residual frames 115. The process of prediction typically comprises receiving an input frame of video, determining a prediction image similar to the input frame of video, and subtracting the prediction image from the input frame of video to produce a residual frame of video. The residual frame of video typically comprises less data than the input frame of video and thus is easier to encode and compress. Subtracting a prediction image from an input image typically comprises subtracting the pixel information of the prediction image from the pixel information of the input image, resulting in a residual image composed of pixel information representing the difference of the subtraction. Either the received input frame or the produced residual frame 115 may be comprised of macroblocks, which in one embodiment may comprise 16-by-16 squares of pixels.

Prediction module 110 may utilize spatial prediction (identifying objects, shapes, curves, lines, or any other characteristic of a single image similar to a prediction image), temporal prediction (identifying characteristics of precedent or subsequent frames, such as the motion of an object), or any other suitable method to determine a prediction image for a raw video data 105 image. The prediction image may come from a dictionary or library of reference images available to both the encoder and decoder. Alternatively, the prediction image may come from a previously encoded frame, or a frame which will be encoded in the future. Each prediction image may be comprised of one or more than one prediction sub-images. For instance, prediction module 100 may determine a first prediction image for the background of an input image and a second prediction image for an object in the foreground of the input image. The term "prediction image" thus may encompass the combination of all prediction sub-images into a single image. Prediction module 100 then subtracts the prediction image from the raw video data 105 image and outputs residual frame 115.

Transformation module 120 receives residual image 115 in pixel form, processes the residual image 115 and outputs residual image coefficients 125 (the residual image in the transform domain). Transformation module 120 may apply a DCT, a wavelet transform, or any other Fourier-related transform to the received residual image 115. In one embodiment, transformation module 120 processes one macroblock of residual frame at a time, producing one set of coefficients for each processed macroblock. In embodiment, one coefficient is produced for each pixel of residual image 115.

Quantization module 130 receives coefficients 125, quantizes the coefficients 125 and outputs quantized coefficients 135. The quantization of coefficients 125 typically results in many higher frequency coefficients being rounded to zero, reducing the storage space required to maintain the coefficients. Quantization module 130 may compress the range of received coefficients 125 to a single quantum value to produce quantized coefficients 135. In one embodiment, quantization module 130 divides the received coefficients by a selected quantization matrix, and the resulting quotients are rounded to the nearest integer to produced quantized coefficients 135.

Entropy encoding module 140 receives quantized coefficients 135, compresses the coefficients, and outputs compressed bitstream 145. Entropy encoding module 140 utilizes a lossless compression method, such as CAVLC or CABAC. Entropy encoding module 140 may perform incremental encoding, outputting one or more bits at a time as the received quantized coefficients 135 are being compressed. In addition to compressing received quantized coefficients 135, entropy encoding module 140 may compress any syntax element. Syntax elements comprise (in addition to quantized coefficients 135), information which enables a decoder to re-create the prediction, information about the structure of the compressed data, information about the encoded video sequence, information about the compression tools used during encoding, or any other information which describes the video or the encoding and compression process. The compressed bitstream 145 may be transmitted to a decoder for decoding and playback.

An Exemplary Computing System for the H.264 Video Encoder

Figure 2:
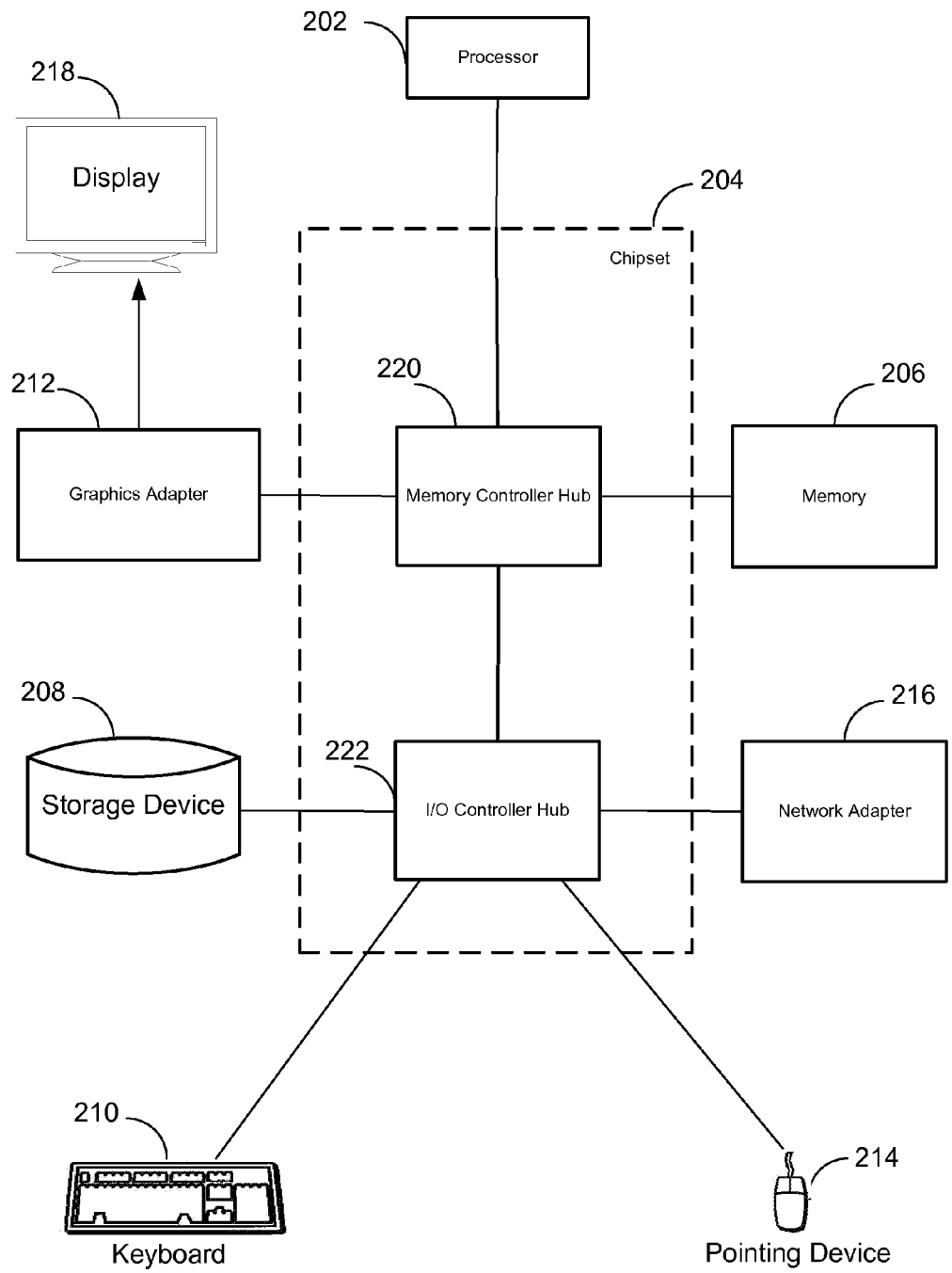
FIG. 2 is high-level block diagram illustrating a typical environment for implementing an H.264 encoder according to one embodiment.

FIG. 2 is high-level block diagram illustrating a typical environment for implementing an H.264 encoder according to one embodiment. Illustrated are at least one processor 202 coupled to a chipset 204. Also coupled to the chipset 204 are the memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222, such as in a computer system. In another embodiment, the memory 206 is coupled directly to the processor 202 instead of the chipset 204, or is located within processor 202, such as in a system-on-a-chip environment.

The storage device 208 is any computer-readable storage medium, such as a hard drive, compact disk read-only memory (CD-ROM), DVD, or a solid-state memory device. The memory 206 holds instructions and data used by the processor 202, and may be RAM, cache, ROM or any other similar medium. The pointing device 214 may be a mouse, track ball, or other type of pointing device, and is used in combination with the keyboard 210 to input data into chipset 204. The graphics adapter 212 displays images and other information on the display 218. The network adapter 216 couples the chipset 204 to a network.

In one embodiment, the environment of FIG. 2 is implemented within a computer system. As is known in the art, a computer can have different and/or other components than those shown in FIG. 2. In addition, a computer can lack certain illustrated components. In one embodiment, a computer can lack a keyboard 210, pointing device 214, graphics adapter 212, and/or display 218. Moreover, the storage device 208 can be local and/or remote from a computer (such as embodied within a storage area network (SAN)).

As is known in the art, a computer can be adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here.

In addition, the functionality attributed to the modules can be performed by other or different modules in other embodiments. Moreover, this description occasionally omits the term "module" for purposes of clarity and convenience.

H.264 CABAC Encoder Overview

Figure 3:
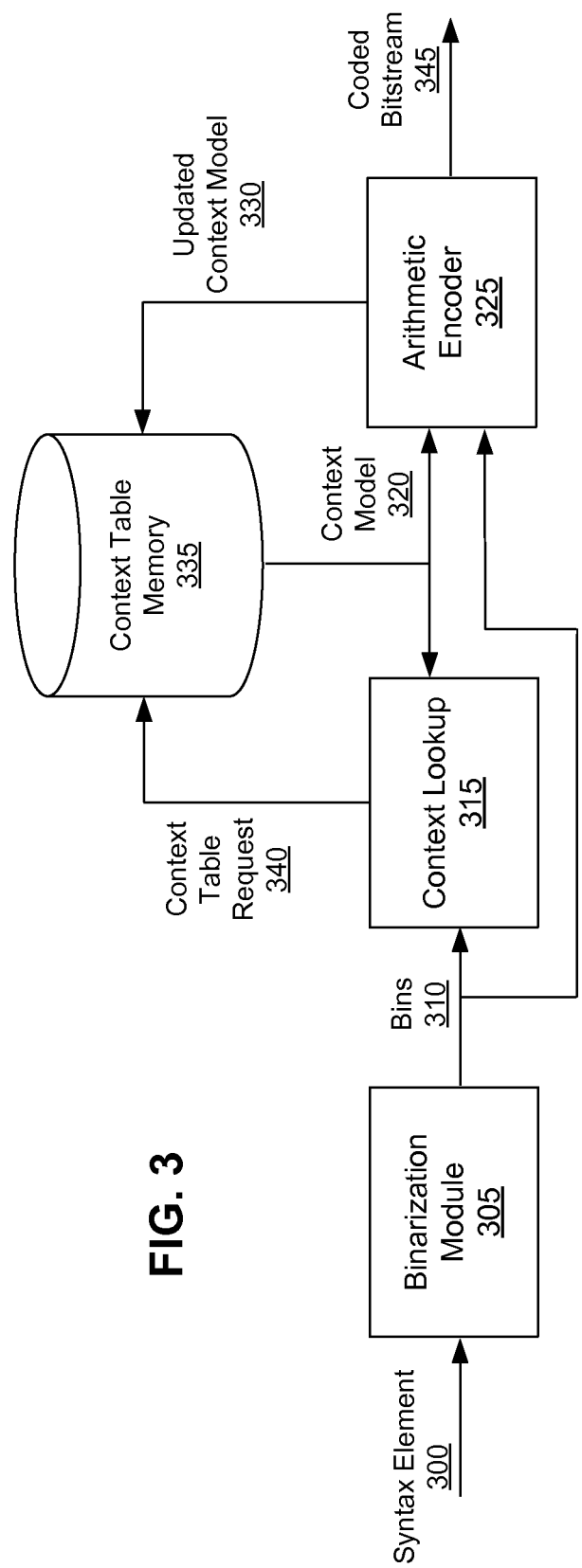
FIG. 3 is high-level block diagram illustrating an H.264 CABAC encoder according to one embodiment.

FIG. 3 is high-level block diagram illustrating an H.264 CABAC encoder according to one embodiment. The CABAC encoder may be implemented by the entropy encoding module 140 in the H.264 video encoding process. The primary components of the exemplary CABAC encoder are the binarization module 305, the context lookup module 315, the arithmetic encoder module 325 and the context table memory 335. Additional or fewer modules may be used to implement CABAC encoding functionality. The CABAC encoder will be described in the context of a single encoding cycle for the purposes of clarity; multiple cycles of encoding may be performed by the CABAC encoding, such as in a pipelined implementation of the CABAC encoder.

The binarization module 305 receives a syntax element 300 and outputs the syntax element 300 in the form of ordered binary bits, referred to as "bins" 310. In one embodiment, the syntax element 300 comprises a quantized coefficient, or any of the video information or encoding information discussed above. The syntax element 300 may additionally comprise a syntax element identifier ("syntax element ID") that identifies the syntax element. For instance, the syntax element ID may identify which macroblock a quantized coefficient syntax element 300 belongs to, which portion of the encoded video a quantized coefficient syntax element 300 appears in, or which type of quantization was performed in encoding a video. In one embodiment, the order of the bins of the binarized syntax element must be maintained. For example, the arithmetic encoder 325 may be required to encode the bins in the order that they are outputted by binarization module 305 in order for a decoder to decode the encoded binarized syntax element. Finally, the syntax element 300 may comprise a context model index, identifying a context model to be used in arithmetic encoding.

Bins 310 are individual binary bits representing a received syntax element 300 and may comprise a syntax element ID, identifying the syntax element each bin represents. Alternatively, each bin 310 may include a context model index which identifies a context model associated with each bin 310. The context index may be derived from the syntax element ID, or may be independently derived or received. In one embodiment, the binarization module 305 outputs bins 310 sequentially, for instance, one bin 310 per clock cycle. Alternatively, the binarization module 305 may output multiple bins 310 per clock cycle. In one embodiment, the binarization module 305 transforms the received syntax element 300 into binary form. For instance, the syntax element 300 may be received in integer form, and the binarization module converts the syntax element 300 to binary bins 310.

Context lookup module 315 receives the bins 310 and transmits a context table request 340 to context table memory 335. The context table request 340 may identify the syntax element associated with a received bin 310. In one embodiment, a received bin 310 includes a syntax element ID, and the context lookup module 315 parses this syntax element ID and transmits it with the context table request 340. The context table request 340 may comprise a context model index which may identify a specific context model within context table memory 335, or a specific location within context table memory 335 containing a specific context model. Context lookup module 315 may request a context model from context table memory 335 once for each syntax element, or may request the same context model multiple times for a given syntax element, such as once per received bin. For simplicity, the term "context model" may refer to a singular context model, multiple context models, or a context model word comprising multiple context models stored together.

Context table memory 335 receives the context table request 340 and outputs context model 320 based on the request 340. The context table memory 335 may comprise one or more memory locations and may contain one or more context models per memory location. For instance, each context table memory location may store a context model word comprising 32 context models. In one embodiment, context table memory 335 indexes context models by context model index. The context model index may comprise a memory location and a specific context model stored at that memory location. For example, in one exemplary embodiment, the context model index for context model "14" at memory address "E41C" is "E41C14". The context table memory 335 may be initialized to default values after a set period of time, after encoding a certain number of frames, after encoding a certain number of video slices, or any other suitable time. Reference to a "syntax element's context model" refers to the context model associated with the context model index, the syntax element or the syntax element ID.

The stored context models may comprise a probability that a received bin will be a specific bit, and may comprise any form sufficient to allow arithmetic encoder 325 to encode bins 310. For instance, the stored context models may comprise 7-bit words made up of a 1-bit most probable bit (MPB) and a 6-bit binary probability that a received bin is identical to the MPB. Alternatively, the context models may instead comprise the least probable bit (LPB), the probability that a received bin is identical to the LPB, or any combination of an identified bit and a probability of receiving the identified bit or its inverse. In addition, the context models may be stored in more or fewer than 7 bits in context table memory 335, and probabilities may comprise more or fewer than 6 bits. In one embodiment, context table memory 335 stores an index for each context model and computes the probability component of a context model when that context model is requested.

The context table memory 335 accesses and outputs the requested context model 320 identified by context table request 340. The context model 320 may be transmitted to context lookup module 315 for subsequent transmission to arithmetic encoder 325, or may be transmitted directly to arithmetic encoder 325. Arithmetic encoder 325 receives a context model 320 and a bin 310, and produces an updated context model 330 and a coded bitstream 345. In one embodiment, only one context model 320 is used to encode bins of the same syntax element; alternatively, more than one context model 320 may be used to encode the bins of a given syntax element. The arithmetic encoder 325 adaptively updates context model 320 depending on the content of received bins 310. In one embodiment, the arithmetic encoder 325 updates context model 320 each time a bin 310 is received. While encoding the received bins 310 of a syntax element, arithmetic encoder 325 may maintain updated context model 330 internally, using updated context model 330 to encode each subsequent bin of a syntax element, updating the context model after encoding each subsequent bin. The context models may be updated according to the probability state index transition rules defined in H.264, or may be updated using any suitable adaptive method.

The updated context model 330 may be transmitted to context table memory 335 each time the context model is updated, or after an entire syntax element is encoded. The context table memory 335 may write the updated context model 330 to the memory location of the original context model 320, overwriting the original context model 320. In one embodiment, the updated context model 330 is stalled when context table memory 335 is outputting context model 320. In one embodiment, updated context model 330 is written to another location, such as cache memory, where it is maintained until it can be written to context table memory 335.

Arithmetic encoder 325 uses context model 320 to encode received bins 310. Arithmetic encoder 325 may encode received bins 310 into a single fractional number n, where (0.0≤n<1.0). To encode received bins 310, encoder 325 may maintain a numerical interval representing the probability of receiving previously received bins 310. The numerical interval may be have an upper interval limit and a lower interval limit, and may be represented by range R, comprising the difference between the upper interval limit and the lower interval limit. In one embodiment, the numerical interval is initialized to the interval [0, 1] and is updated for each received bin 310. In one embodiment, the maintained interval has an upper interval limit, $R_U$, and lower interval limit, $R_L$, which are updated when encoding a received bin.

In one embodiment, updated $R_U$ and $R_L$ limits are defined by:

$$R_L'=R_L+(R_U-R_L) \times F_X(x_n+1) \quad (1)$$

and:

$$R_U'=R_L+(R_U-R_L) \times F_X(x_n) \quad (2)$$

In equations (1) and (2), $R_L'$ represents an updated limit of $R_L$, $R_U'$ represents an updated limit of $R_U$, $F_X$ represents the cumulative density function of received bins 310 represented by the context model 320, and $x_n$ represents the values of the random variable corresponding to the received bins 310.

In one embodiment, the probability of receiving a "0" bin $p_0$ is determined from the context model 320. For instance, the context model 320 may provide the MPB and probability of receiving the MPB, p. In the event that the MPB is a "1", then $p_0$ is (1−p). In the event that the MPB is a "0", then $p_0$=p. The updated interval limits in such an embodiment vary depending on the value of the received bin 310. For a "0" bin, these limits are defined by:

$$R_L'=R_L \quad (3)$$

$$R_U'=R_L+(R_U-R_L) \times p_0 \quad (4)$$

For a "1" bin, these limits are defined by:

$$R_L'=R_L+(R_U-R_L) \times p_0 \quad (5)$$

$$R_U'=R_U \quad (6)$$

The arithmetic encoder 325 may update the maintained interval each time a bin 310 is received. In doing so, the maintained interval $R_I=(R_L, R_U)$ is restricted and gets smaller over time. If at any point in time $R_I$ is completely contained in the intervals $E_1$: [0, 0.5] or $E_2$: [0.5, 1], then $R_I$ may be expanded according to the following definitions:

$$E_1(x)=2x \quad (7)$$

$$E_2(x)=2(x-0.5) \quad (8)$$

In equations (7) and (8), x represents the limits $R_L$ and $R_U$. For example, if $R_I$=(0.243, 0.492), then $R_I'$ (the updated interval) may be expanded to the interval (0.486, 0.984). Similarly, if $R_I$=(0.631, 0.855), then $R_I'$ may be expanded to the interval (0.262, 0.710). In the event that after updating $R_I$, $R_I$ is still completely contained in the intervals $E_1$ or $E_2$, the process may be iterated until $R_I$ is no longer completely contained in $E_1$ or $E_2$. For instance, if $R_I$=(0.542, 0.689), then $R_I'$ may be expanded first to the interval (0.084, 0.378), and a second time to the interval (0.168, 0.756).

In the embodiment described above, each time $R_I$ is updated according to $E_1(x)$ or $E_2(x)$, the arithmetic encoder 325 may output a coded bit. For instance, when $R_I$ is updated according to $E_1(x)$, the arithmetic encoder outputs a "0", and when $R_I$ is updated according to $E_2(x)$, the arithmetic encoder outputs a "1". In one embodiment, arithmetic encoder 325 does not output any bits when $R_I$ isn't updated according to $E_1(x)$ or $E_2(x)$ (for instance, when $R_I$ receives a bin 310, and the resulting updated interval $R_I'$ is not completely contained in the intervals $E_1$ or $E_2$). The arithmetic encoder may output coded bits incrementally as $R_I$ is updated according to $E_1(x)$ or $E_2(x)$, or may output coded bits in groups. The outputted coded bits form coded bitstream 345.

Dual-Pipeline CABAC Encoder Implementation

Figure 4:
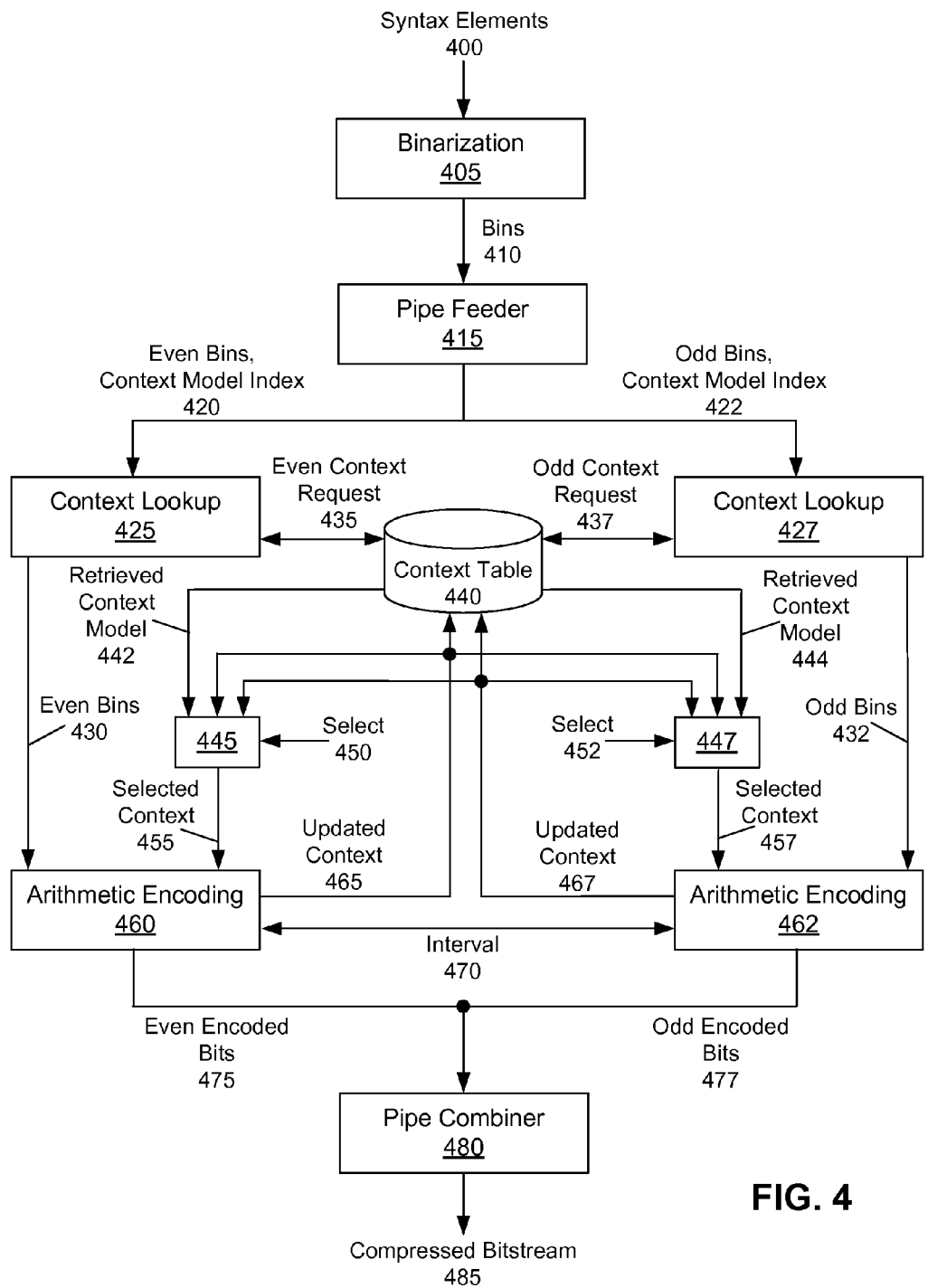
FIG. 4 is a high-level block diagram illustrating a video processing system with a dual-pipeline implementation of an H.264 CABAC encoder according to one embodiment.

FIG. 4 is a high-level block diagram illustrating a video processing system with a dual-pipeline implementation of an H.264 CABAC encoder according to one embodiment. This architecture may be implemented with computer instructions stored on a computer-readable storage medium, executable by a processor. Alternatively, this architecture may be implemented in computer hardware. In one embodiment, the dual-pipeline CABAC encoder architecture is implemented in a special-purpose dedicated processor, such as an ASIC, or a customizable general-purpose processor, such as an FPGA. The dual-pipeline CABAC encoder may also be implemented with a commercially available CPU or GPU, with one or more processor cores, or may be implemented with a system-on-a-chip integrated circuit or a microcontroller. Further, this architecture may be implemented with a combination of chips and/or computer instructions. For simplicity, the processing described herein is described in terms of clock cycles and a synchronous pipelined environment, though this architecture is equally applicable in an asynchronous environment.

Binarization module 405 receives syntax elements 400 and produces bins 410. In one embodiment, the bins 410 are produced using the method described above with respect to FIG. 3. In addition, the bins associated with each syntax element 400 may also be associated with a context model index identifying a context model associated with the bins. Pipe feeder module 415 receives the bins 410 and outputs even bins 420 and odd bins 422. In one embodiment, a plurality of syntax elements are binarized consecutively, and binarization module 405 outputs bins 410 until the plurality of binarized syntax elements have been outputted.

Pipe feeder module 415 may output two received bins (a "bin pair"), one even bin 420 and one odd bin 422, simultaneously. In one embodiment, two received bins are outputted once each clock cycle until each of the received bins 410 have been outputted. The context model index associated with each received bin 410 may be outputted with each bins or bin pair. The pipe feeder module 415 may output even bins 420 to context lookup module 425 (the "even pipeline") and odd bins 422 to context lookup module 427 (the "odd pipeline"). In the event that a first binarized syntax element has an odd number of bins, the last bin of the syntax element may be outputted in the same bin pair or on the same clock edge as the first bin of a second binarized syntax element.

In one example embodiment, a first syntax element (with context model index "010124") is binarized into a 5-bit word ($x_{[4-0]}$), and second syntax element (with context model index "010120") is binarized into a 4-bit word ($y_{[3-0]}$). Pipe feeder module 415 stores the binarized syntax elements until they are completely outputted as bins 420 and 422. On a first clock edge, bin $x_0$ and context model index "010124" are outputted on the even pipeline to context lookup module 425, and bin $x_1$ and context model index "010124" are outputted on the odd pipeline to context lookup module 427. On the following clock edge, bin $x_2$ and bin $x_3$ (and "010124") are outputted on the even pipeline and odd pipeline, respectively. On the following clock edge, bin $x_4$ and "010124" are outputted on the even pipeline, and bin $y_0$ and "010120" are outputted on the odd pipeline. Bin $y_1$ and bin $y_2$ are outputted with "010120" on the even and odd pipelines respectively on the following clock edge, and bin $y_3$ is outputted with "010120" on the even pipeline on the next clock cycle.

Context lookup modules 425 and 427 receive even bins 420 and odd bins 422, respectively. Context lookup modules 425 and 427 may request a context model from context table 440 in response to receiving bins from pipe feeder module 415. In one embodiment, context lookup modules 425 and 427 transmit requests 435 and 437 for a context model from context table 440 by transmitting the context model index associated with the received bins to context table 440.

In one embodiment, the context models are indexed by context model indexes. The context model index may be numerical, allowing a context model associated with the context model index to be retrieved when the context model index is received at an address port on context lookup table 440. In alternative embodiments, a received context model index is modified prior to being received at an address port, or the context model index is transmitted to a context table memory address lookup table in order to retrieve the context table address for the associated context model. In addition to an address port, context table 440 may have a read/write port, and may be either written to or read from in a single clock cycle.

In the event that context lookup modules 425 and 427 each receive a bin from the same binarized syntax element, either context lookup module 425 or context lookup module 427 or both may request the context model associated with the binarized syntax element, and either context lookup module or both may receive the requested context model. In the event that context lookup modules 425 and 427 each receive a bin from different binarized syntax elements, context lookup module 425 may request a context model and a one clock cycle stall may be inserted into both pipelines so that context lookup module 427 may request a context model in the next clock cycle. Alternatively, context lookup module 427 may request a context model, and a stall may be inserted into the pipeline so that context lookup module 425 may request a context model in the next clock cycle. The context models may be organized in context table 440 in such a way that in all scenarios where different context models may be requested simultaneously, the different context models are located at the same context table 440 address, and thus the different context models can be retrieved in a single memory read.

In one embodiment, both context lookup modules 425 and 427 may request a context model from context table 440. In such an embodiment, both context lookup modules 425 and 427 may receive a context model from context table 440 in the same clock cycle, or both may receive context models in subsequent clock cycles. Context table 440 may output the entire contents of a memory address, which as discussed above, may comprise multiple context models. In one embodiment, the contents of a memory address is outputted in response to a request for a specific context model, and additional logic parses the contents of the memory address and transmits only the requested specific context model to context lookup modules 425 or 427. Likewise, in the event that both context lookup modules 425 and 427 request different context models, if both context models are stored at the same context table 440 address, the additional logic may receive the contents of the memory address and may transmit only the requested context models to context lookup modules 425 and 427. Where context table 440 is described above as transmitting retrieved context models to context lookup modules 425 and 427, context table 440 may instead transmit retrieved context models to multiplexor gates 445 and 447 and retrieved context models 442 and 444, respectively.

Context table 440 may receive a request for a context model (a "read request") and a request to update a context model (a "write request") in the same clock cycle. In this event, context table 440 may give preference to either the read request or the write request if the context table 440 is incapable of reading and writing in the same clock cycle. In the event that either the read request or the write request gets priority, the context table 440 may request a pipeline stall so that the reading and writing operations occur in subsequent clock cycles.

Updating a context model within context table 440 may comprise writing an updated context model over a stored context model. The process of arithmetic encoding generally comprises receiving a context model (which as discussed above comprises a probability of a receiving a particular bin) and updating the probability of the context model based on the received bin. If context table 440 receives a write request to update a particular context model with the updated context model, the contents of the location within context table 440 storing the particular context model may be replaced with the received updated context model. In one embodiment, only the particular context model will be overwritten. In an alternative embodiment, the entire context table 440 memory address containing the context model will be overwritten; in such embodiments, the received updated context model comprises one or more updated context models and all other unaltered context models stored at the memory address. In one embodiment, write requests include the memory address and/or the context model index to be overwritten.

As described above, retrieved context models requested from context table 440 may be transmitted to context lookup modules 425 and 427, or may be transmitted as retrieved context models 442 and 444 to mux gates 445 and 447, respectively. In the same clock cycle that context lookup modules 425 and 427 request context models from context table 440, context lookup modules 425 may output received even bins 420 as even bins 430 to arithmetic encoding module 460 and context lookup module 427 may output received odd bins 422 as odd bins 432 to arithmetic encoding module 462. In one embodiment, bins 430 and 432 are delayed in the even and odd pipeline, respectively, by one or more clock cycles to arrive at arithmetic encoding modules 460 and 462 at the same clock cycle as selected context models 455 and 457. In one embodiment, the arithmetic encoding modules 460 and 462 receive bins 430 and 432 and associated selected context models 455 and 457 in different clock cycles and delay processing either bins 430 and 432 or selected context models 455 and 457 one or more clock cycles until associated bins and context models can be processed together.

Mux gates 445 and 447 may receive multiple context models as inputs and output a selected context model 455 and 447, respectively. Either mux gate 445 or 447 may receive either context model 442 or 444, or both, and may receive either updated context model 465 or 467, or both. In addition, mux gates 445 and 447 may receive additional context models not shown in FIG. 4, such as context models received from an additional module or an external source. In one embodiment, mux gates 445 and 447 transmit context modules between themselves. In addition, mux gates 445 and 447 may be implemented by a single mux gate, which may output both selected context models 455 and 457.

In one embodiment, one or more context models received by mux gates 445 and 447 may comprise a context model word containing multiple context models as stored in a context table 440 memory address. In such embodiments, mux gates 445 and 447 may parse a single context model from the context model word to output as selected context model 455 and 457, or may output the entire context model word as selected context model 455 and 457. Mux gates 445 and 447 may utilize select logic 450 and 452 to select among multiple context models received as inputs to output as selected context models 455 and 457. Select logic 450 and 452 may utilize a variety of factors in selecting a context model, such as context model index, time since last context model update, the most recent version of a particular context model, the source of each context model, or any other factor necessary to select the most relevant context model. The mux gates 445 and 447 may be standalone modules, or may be implemented within arithmetic encoding modules 460 and 462, respectively, or any other module.

Arithmetic encoding modules 460 and 462 encode bins 430 and 432 using associated selected context models 455 and 457. As discussed above, each bin received by an arithmetic encoder has an associated context model, retrieved either from context table 440 or selected among recently updated context models. When an arithmetic encoding module 460 or 462 receives both a bin and an associated context model, the arithmetic encoding module 460 or 462 can encode the received bin. As also discussed above, CABAC encoding may comprise maintaining an interval, updating and/or restricting the interval based on the received bin and associated context model, and outputting an encoded bit if the interval falls in a pre-designated intervals. In one embodiment, the maintained interval 470 is transmitted between arithmetic encoding modules 460 and 462 for encoding. Alternatively, arithmetic encoding module 462 may utilize prediction logic which predicts the interval updated in arithmetic encoding module 460 for use in encoding an odd bin 432.

In the event that arithmetic encoding module 460 and arithmetic encoding module 462 each receive a bin requiring use of the same context model, arithmetic encoding module 460 may update the context model and may provide the updated context model to arithmetic encoding module 462 for use in encoding the received bin in the same clock cycle. Alternatively, arithmetic encoding module 462 may use prediction logic to receive a prediction of the updated context model for use in encoding the received bin in the same clock cycle.

Arithmetic encoding modules 460 and 462 may update received selected context models 455 and 457 after encoding received bins 430 and 432. In one embodiment, updating a context model comprises adjusting the probability of the context model to reflect the value of an encoded bin. Updating context models may comprise adhering to a pre-designated method for adjusting context model probabilities. In one embodiment, received selected context models 455 and 457 comprise context model words containing multiple context models. In such an embodiment, updating context models comprises updating only the particular context model in the context model word used in encoding the received bins, and outputting the remainder of the context model word without alteration. Updated context models may be outputted as updated context models 465 and 467, and may be transmitted to context table 440, mux gate 445, and mux gate 447. In one embodiment, updated context models 465 and 467 may be transmitted to context table 440 with a write request.

Arithmetic encoding module outputs encoded bits as even encoded bits 475 and arithmetic encoding module outputs encoded bits as odd encoded bits 477. Encoded bits 475 and 477 are received by pipe combiner module 480. Pipe combiner module 480 combines encoded bits 475 and 477 and outputs compressed bitstream 485. In one embodiment, compressed bitstream 485 comprises encoded bits 475 and 477 combined into a single bitstream in the order they are received. If an even encoded bit 475 is received in the same clock cycle as an odd encoded bit 477, pipe combiner module 480 may output the even encoded bit 475 before odd encoded bit 477 in bitstream 485. If only one encoded bit is received in a particular clock cycle, the received encoded bit is outputted by pipe combiner 480. Pipe combiner 480 may output bits as they are received, or may store received bits and output bits in groups.

Dual-Pipeline CABAC Encoder Implementation

Figure 5:
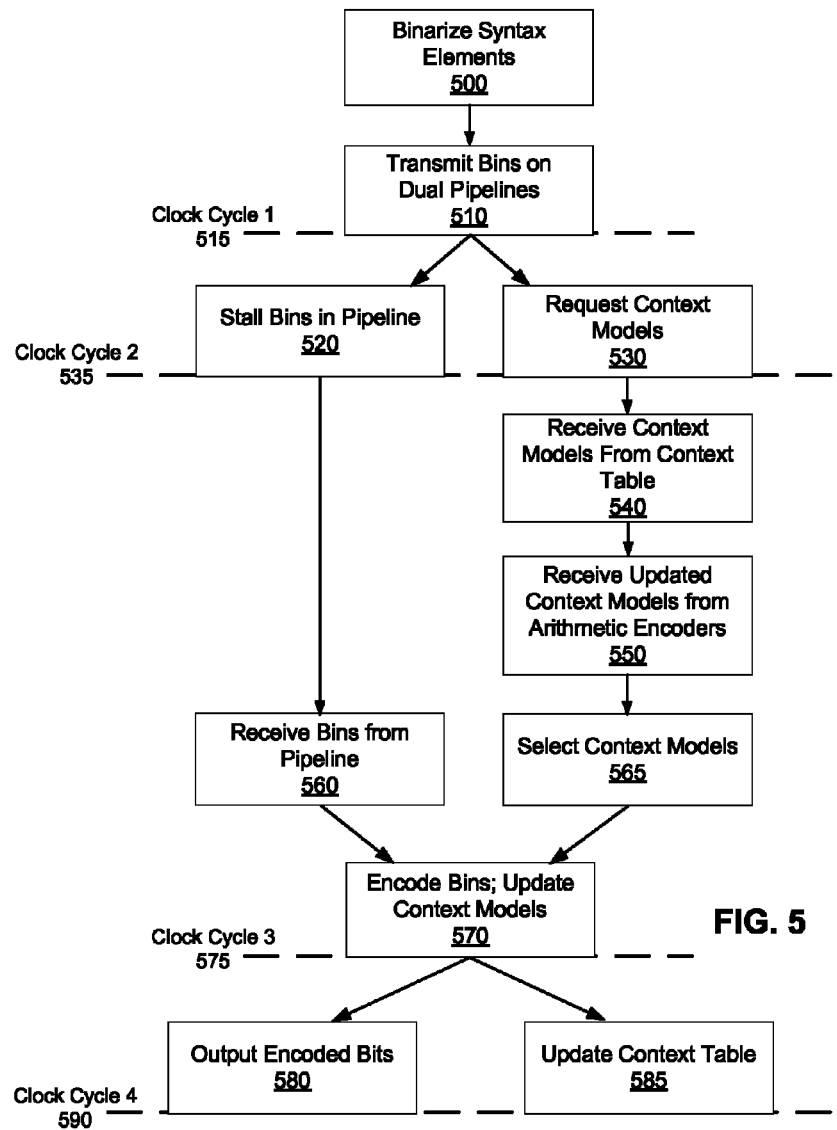
FIG. 5 is a flow chart illustrating steps performed by a video processing system with a dual-pipeline implementation of an H.264 CABAC encoder, according to one embodiment.

FIG. 5 is a flow chart illustrating steps performed by a video processing system with a dual-pipeline implementation of an H.264 CABAC encoder, according to one embodiment. The embodiment described in FIG. 5 is implemented with a 4-clock cycle pipeline. Other embodiments may be implemented with pipelines of fewer or more clock cycles, or may be implemented asynchronously. Further, the described pipelines may be implemented with fewer or more functionalities than the ones described.

In clock cycle 1 515, one or more syntax elements are binarized 500. The binarized syntax elements are then alternately transmitted 510 one or two bins at a time. If one bin is transmitted 510, then the bin may be transmitted to the least recently used pipeline. For instance, if in the previous clock cycle, a bin was transmitted on the even pipeline, a bin may be transmitted on the odd pipeline in the current clock cycle. Alternatively, if one bin is transmitted 510, the bin may be transmitted only on the even or the odd pipeline. If two bins are transmitted 510, the first bin may be transmitted on the even pipeline and the second bin may be transmitted on the odd pipeline. In clock cycle 2 535, transmitted bins are stalled 520 in pipelines. In the same clock cycle, context models are requested 530 from a context table.

In clock cycle 3 575, each pipeline receives 540 context models from the context table and receives 550 updated context models from arithmetic encoders. Additional context models may be received from other modules, such as cache memory or external sources. Each pipeline selects 565 a context model and receives 560 a stalled bin. The received bin is encoded 570 using the selected context model, and the context model is updated. In clock cycle 4 590, encoded bits are outputted 580 and the context table is updated 585 with the updated context model.

Dual-Pipeline CABAC Encoder Cache Management System Implementation

Figure 6:
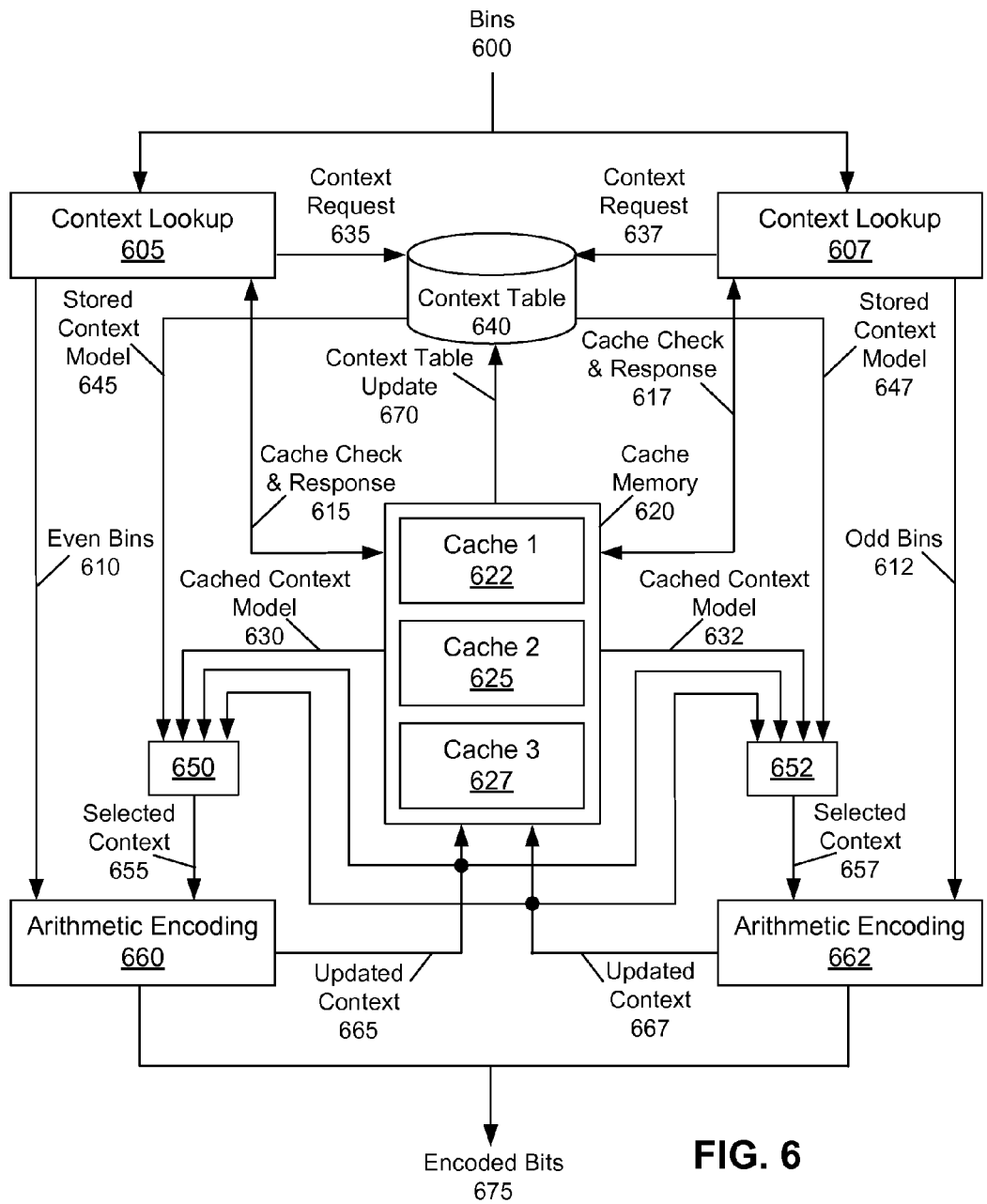
FIG. 6 is a high-level block diagram illustrating a context model cache-management system for implementation in a video processing system with a dual-pipeline implementation of an H.264 CABAC encoder, according to one embodiment.

FIG. 6 is a high-level block diagram illustrating a context model cache-management system for implementation in a video processing system with a dual-pipeline implementation of an H.264 CABAC encoder, according to one embodiment. The cache-management system may be implemented in the dual-pipeline CABAC architecture of FIG. 4, or in any CABAC architecture capable of encoding two bits in a single clock cycle. The cache memory module 620 may be implemented in cache or any type of memory, and may be internal or external to context table 640 or any other module.

Bins 600 are received by context lookup modules 605 and 607 and may be transmitted to arithmetic encoding modules 660 and 662 as even bins 610 and odd bins 612, respectively. As discussed above with regards to FIGS. 3 and 4, context lookup modules 605 and 607 may request a context model for received bins 600 using, for example, a context model index received with bins 600. Context lookup modules 605 and 607 may request a context model from context table 640. Context table 440 may comprise multiple addresses, each capable of storing a context model word, the context model word comprising one or more context models, as discussed above. Further, context models may be used by arithmetic encoding modules 660 and 662 to encode received bins 610 and 612 as also discussed above. After bins 610 and 612 are encoded, arithmetic encoding modules 660 and 662 may output updated context models 665 and 667, respectively, and may output encoded bits 675.

Context lookup modules 605 and 607 may request a context model from cache memory 620. In one embodiment, cache memory 620 may comprise three individual cache memories coupled together, referred to herein as cache 1, 622, cache 2, 625, and cache 3, 627. For simplicity, the remainder of this description will assume that cache memory 620 comprises three individual cache memories, though in alternate embodiments, cache memory 620 may be composed of a single cache memory, or any number of cache memories coupled together. Caches 622, 625, and 627 may comprise a memory of any size or capacity. In one embodiment, caches 622, 625, and 627 may each have the capacity to store one context model word, the context model word comprising one or more context models. Caches 622, 625, and 627 may also be capable of storing the contents of one context table 640 memory address. Alternatively, caches 622, 625, and 627 may each be capable of storing one context model, multiple context model words, multiple context table 640 memory address contents, or multiple context models not organized in context model word format.

In one embodiment, cache memory 620 stores the context model indexes associated with stored context models. The context model indexes may be stored in caches 622, 625, and 627, or may be stored externally. In one embodiment, an alternative context model identifier is stored in cache memory 620, for instance the context table 640 addresses of context model words stored in cache memory 620. Caches 622, 625, and 627 may have one read/write port, and may be written to or read from in a single clock cycle, or both. Alternatively, caches 622, 625, and 627 may have multiple read and write ports.

Context lookup modules 605 and 607 may transmit cache checks 615 and 617, respectively, when requesting particular context models prior to transmitting context requests 635 and 637. Cache checks 615 and 617 may comprise context model indexes or other context model identifiers, and may request in response a determination of whether cache memory 620 contains the requested context models. For example, context lookup module 605 may transmit the context model index "105603", indicating context model "03" at context table 640 memory address "1056", to cache memory 620. In response to receiving this context model index, cache memory 620 may determine whether caches 622, 625, or 627 contain the context model word with context model index "1056". This may comprise reading context model indexes stored in caches 622, 625, and 627, or may comprise identifying context models or context model words stored in caches 622, 625, and 627 independently. After determining whether a requested context model is stored in cache, cache memory 620 may respond 615 and 617 to context lookup modules 605 and 607, respectively, indicating whether the requested context model is stored in cache. In one embodiment, if cache memory 620 determines that requested context models are stored in cache, responses 615 and 617 may comprise a "hit" response. If the requested context models aren't stored in cache, responses 615 and 617 may comprise a "miss" response.

In one embodiment, if context lookup modules 605 and 607 receive a "hit" response 615 or 617, context lookup modules 605 and 607 may not request a context model from context table 640. If a "miss" response 615 or 617 is received, context lookup modules 605 and 607 may request 635 and 637 context models from context table 640. Alternatively, context lookup modules 605 and 607 may request 635 and 637 context models from context table 640 even if a "hit" response 615 and 617 is received. If cache memory 620 contains a requested context model, the requested context model may automatically be outputted as cached context model 630 and 632 when cache checks 615 and 617 are received, or may only output the requested context model when specifically directed to do so. In one embodiment, an entire stored context model word is outputted; alternatively, only the requested context model is outputted. Likewise, if context table 640 receives a context model request 635 or 637, context table 640 may output the requested context model as stored context model 645 or 647.

Requested context models may be transmitted to mux gates 650 and 652. In one embodiment, mux gates 650 and 652 receive stored context models 645 and 647, cached context models 630 and 632, and updated context models 665 and 667. Mux gates 650 and 652 may comprise mux gates 445 and 447 discussed above in regards to FIG. 4, and may include select logic to determine which received context model to output as selected context model 655 and 657. In one embodiment, the mux gates 650 and 652 output the most recently updated version of the requested context model.

As updated context models 665 and 667 are written to cache memory 620 after being output by arithmetic encoding modules 660 and 662, the context models stored in cache memory 620 are more recently updated than the associated context models stored in context table 640. Further, if cache memory 620 stores a context model associated with an updated context model 665 or 667, the updated context model 665 or 667 is more recently updated than the associated context model stored in cache memory 620.

For example, context lookup module 605 may request context model "105603" as discussed above. As a result, in one embodiment, mux gate 650 may receive a version of context model "105603" from context table 640 as stored context model 645, from cache memory 620 as cached context model 630, and from arithmetic encoding module as updated context model 665. In such an event, updated context model 665 is selected, as it is the most recently updated version of context model "105603". Alternatively, mux gate 650 may receive a version of context model "105603" from context table 640 as stored context model 645 and from cache memory 620 as cached context model 630, and may receive a version of context model "102809" as updated context model 665. In such an event, cached context model 630 is selected, as it is the most recently updated version of context model "105603", and updated context model 665 is ignored because it is not the requested context model. Further, mux gate 650 may receive a version of context model "105603" from context table 640 as stored context model 645, and may receive a version of context model "102809" from cache memory 620 as cached context model 630 and as updated context model 665. In such an event, stored context model 645 is selected, as it is the most recently updated version of context model "105603", and cached context model 630 and updated context model 665 are ignored because they are not the requested context model.

In addition to transmitting updated context models 660 and 662 to mux gates 650 and 652, arithmetic encoding modules 660 and 662 may transmit updated context models 665 and 667 to cache memory 620 with a write request. In one embodiment, arithmetic encoding modules 660 and 662 transmit context model indexes to cache memory 620, and cache memory 620 stores the context model indexes with the updated context models 660 and 662. Cache memory 620 may output the context model contents of one or more caches 622, 625, and 627 to context table 640 as context table update 670. In one embodiment, cache memory 620 transmits a context model index with context table update 670. A context model index may be transmitted to the address port of context table 640, and context table 640 may write the context model in the context table update 670 to the context table address associated with the received context model index, overwriting and updating the context model stored in context table 640 associated with the context model in the context table update 670. Recall that the term context model as used herein may refer to a singular context model, multiple context models, or a context model word comprising multiple context models stored together.

As discussed immediately above, if context lookup module 605 and 607 request and receive a "miss" signal from cache memory 620, a context model is read from context table 640. In the event that mux gates 650 and 652 select stored context models 645 and 647, mux gates 650 and 652 transmit stored context models 645 and 647 as selected context models 655 and 657 to arithmetic encoding modules 660 and 662. Arithmetic encoding modules 660 and 662 then update the selected context models 655 and 657, outputting them as updated context models 665 and 667. Recall that in this scenario, updated context models 665 and 667 are updated versions of context models not stored in cache memory 620 (as indicated by the "miss" signal received from cache memory 620). In the event that each of cache 622, 625, and 627 are storing an updated context model, at least one of the updated context models stored in 622, 625, and 627 may need to be written to context table 640 prior to updated context models 665 and 667 being written to cache memory 620. In one embodiment, it is critical that no updated context model not yet stored in context table 640 be overwritten by an updated version of a different context model or otherwise discarded. This includes updated context models stored in cache memory 620 and updated context models 665 and 667. It may be acceptable to overwrite an updated context model stored in cache memory 620 with a more recently updated version of the same context model received by cache memory 620 as updated context models 665 and 667.

In one embodiment, each context model stored in cache memory 620 is an updated version of a context model stored in context table 640. Storing updated context models in cache 620 may serve the purpose of accommodating a limited read and write capacity of context table 640. In the event that a context model is requested from context table 640, utilizing cache memory 620 to store updated context models eliminates the need to insert a pipeline stall for cache table 640 memories that can only process one read operation or one write operation per clock cycle. In one embodiment, if in a particular clock cycle a context model is not requested from context table 640, cache memory 620 may transmit an updated context model stored in cache memory 620 to context table 670.

Storing context models in cache memory 620 additionally allows the most recently updated context models to be accessible to arithmetic encoding modules 660 and 662 without having to access the context model from context table 640. In one embodiment, context models recently used in encoding bins are more likely to be used in encoding bins in the immediate future, and storing recently used context models reduces the total number of context model requests transmitted to context table 640. As writing context models from cache memory 620 to context table 640 requires context table 640 inactivity, updated context models stored in cache memory 620 may not be written to context table 640 unless additional cache memory capacity is required. For example, if context lookup modules 605 and 607 request a context model that is stored in cache memory 620, then cache memory 620 may not write an updated context model stored in cache memory 620 to context table 640. In such embodiments, the requested context model is retrieved from cache memory 620 (for instance, cache 622), used to encode a bin, updated reflecting the value of the bin, and written to cache memory 620, overwriting the associated previous location of the context model (cache 622).

In one embodiment, if a "miss" signal is received in response to cache memory 620 being queried by context lookup modules 605 and 607, then a context model is requested from context table 640. As described above, for each context model requested from context table 640, at least one updated context model stored in cache memory 620 may be written to context table 640 to ensure cache memory 620 is able to store the updated version of the requested context model. In one embodiment, the number of clock cycles between context lookup modules 605 and 607 requesting a context model from context table 640 and the arithmetic encoding modules 660 and 662 producing an updated version of the requested context model is determined. In this embodiment, cache memory 620 may write at least one updated context model stored in cache memory 620 to context table 640 within the determined number of clock cycles. In the event that cache memory 620 is unable to write at least one updated context model stored in cache memory 620 to context table 640 (for instance, if context table 640 receives read requests for the duration of the determined number of clock cycles), then a pipeline stall may be inserted into the pipeline so that an updated context model may be written to context table 640.

In one embodiment, selecting an updated context model to write from cache memory 620 to context table 640 comprises selected the least recently updated context model stored in cache memory 620. For example, if cache 622 stores a context model updated 2 clock cycles ago, cache 625 stores a context model updated 4 clock cycles ago, and cache 627 stores a context model updated 10 clock cycles ago, and cache memory 620 may write the updated context model stored in cache 627 to context table 640. Alternatively, cache memory 620 may determine which updated context model stored in cache memory 620 is the least frequently requested or updated over a specific period time, and may write the determined updated context model to context table 640. In yet another embodiment, cache memory 620 may utilize prediction logic to determine which updated context model stored in cache memory 620 is least likely to be requested in the future, and may write the determined updated context model to context table 640. Any suitable method for selecting an updated context model to be written from cache memory 620 to context table 640 may be used.

Context Model Cache-Management Architecture Implementation

Figure 7:
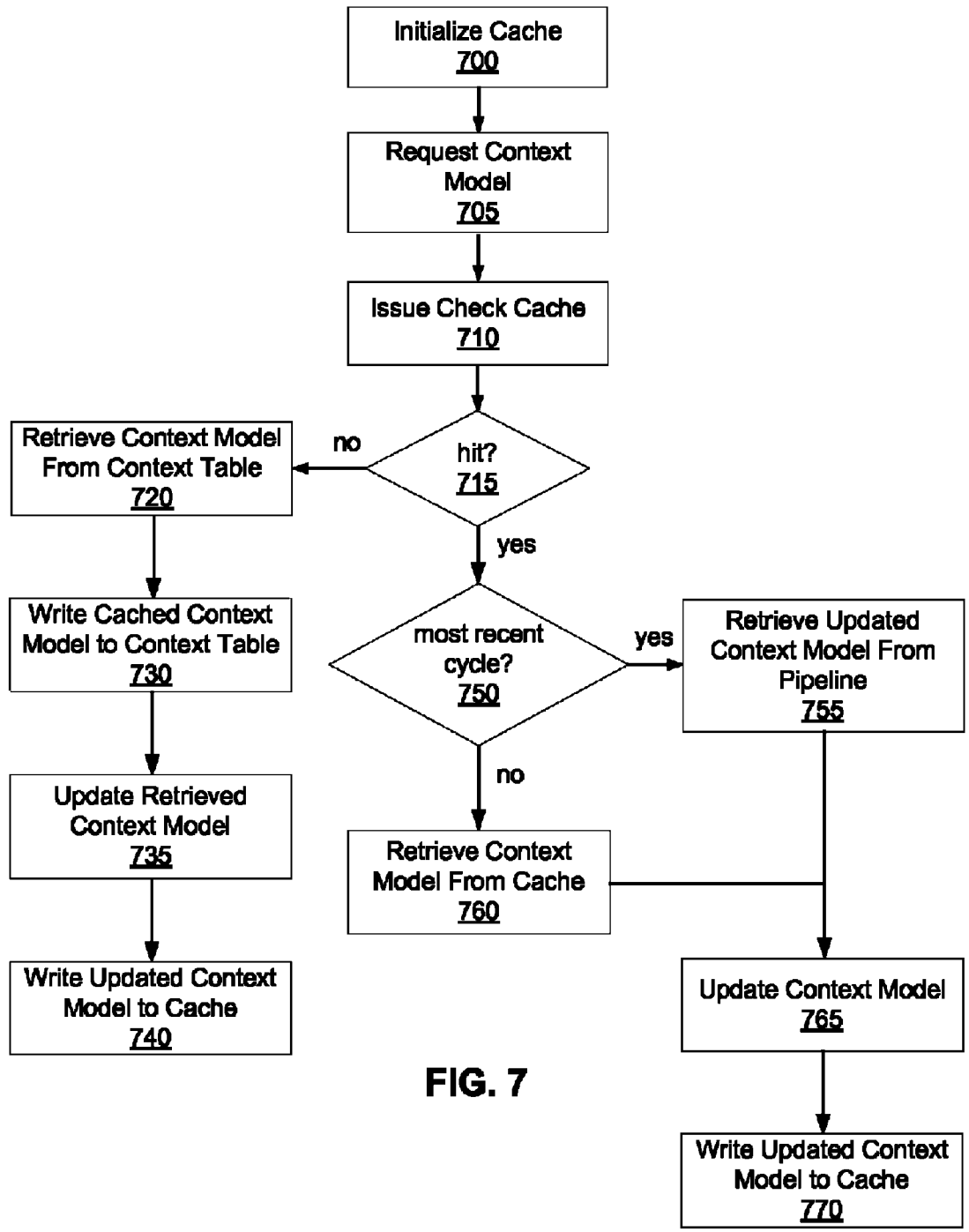
FIG. 7 is a flow chart illustrating steps performed by a context model cache-management system implemented in a video processing system with a dual-pipeline implementation of an H.264 CABAC encoder, according to one embodiment.

FIG. 7 is a flow chart illustrating steps performed by a context model cache-management system implemented in a video processing system with a dual-pipeline implementation of an H.264 CABAC encoder, according to one embodiment.

FIG. 7 may illustrate the steps performed by the context model cache-management system described in FIG. 6, or may illustrate steps performed by the cache-management system of an alternative dual-pipeline H.264 encoder. FIG. 7 describes a context model cache-management system within the context of a single context model request/context model update cycle; as the context model cache-management system is implemented within a pipelined architecture, multiple overlapping iterations of the steps described in FIG. 7 may be performed.

The cache memory is first initialized 700. Initialization of cache memory may comprise writing stored updated context models to a context table or elsewhere for storage. In addition, initialization may comprise writing context models from a context table to cache memory. In one embodiment, the context models written to cache memory during initialization may be context models which are predicted to be requested the most, may be context models which are predicted to be requested the earliest, or may be randomly selected. In one embodiment, no context models are written from a context table to cache memory during initialization. Initialization may occur only once during encoding, may occur at set intervals, may occur at the beginning of encoding each frame or slice, or may never occur.

Next, a context model is requested 705. A cache memory check is issued 710 to determine 715 if an updated version of the requested context model is stored in cache. If the requested context model is not stored in cache (a "miss"), the requested context model is retrieved 720 from the context table. A context model stored in cache (an updated version of an associated context model stored in the context table) is written 730 to the context table, replacing the associated context model stored in the context table. If the retrieved context model is selected for use in encoding, the retrieved context model is updated 735, and written 740 to cache.

If the cache memory check is issued 710 and it is determined 715 that an updated version of the requested context model is stored in cache (a "hit"), it is determined 750 if the requested context model was updated in the most recent clock cycle. If the requested context model was updated in the most recent clock cycle, the context model is retrieved 755 from the pipeline. If the requested context model was not updated in the most recent clock cycle, the context model is retrieved 760 from cache. If the retrieved context model is selected for use in encoding, the retrieved context model is then updated 765, and written 770 to cache.

Additional Configuration Considerations

Some portions of above description describe the embodiments in terms of algorithmic descriptions and processes. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for improving transcoding efficiency, speed and for increasing throughout of coding processing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for managing cache memory in context-adaptive binary arithmetic coding (CABAC) implemented in a synchronous dual-pipelined environment, the method comprising:

receiving, at a CABAC encoder cache memory in a first clock cycle, a first request for a first context model from a first context lookup module communicatively coupled to a first encoder and a second request for a second context model from a second context lookup module communicatively coupled to a second encoder;

determining if the first context model is stored in cache memory, wherein the cache memory is configured to store at least one previously updated context model;

responsive to a determination that a cached version of the first context model is stored in the cache memory, determining whether an updated version of the first context model is available at a respective output of either the first encoder or the second encoder;

responsive to a determination that the updated version of the first context model is available at the respective output, retrieving the updated version of the first context model from the respective output;
providing the updated version of the first context model to the first encoder, wherein the first encoder is configured to
utilize the updated version of the first context model to encode a first bin, and
update the updated version of the first context model to produce a subsequent version of the first context model;
receiving, at the cache memory in a second clock cycle, the subsequent version of the first context model from the output of the first encoder; and
writing the subsequent version of the first context model in the cache memory in response to the receiving the subsequent version at the cache memory.

2. The method of claim 1, further comprising:
writing the subsequent version of the first context model in a context table, wherein
the cache memory is communicatively coupled to the context table,
the context table stores an older version of the first context model, and
the subsequent version of the first context model overwrites the older version of the first context model in the context table.

3. The method of claim 2, further comprising:
determining which of the at least one previously updated context model stored in the cache memory was least recently updated; and
writing the determined previously updated context model to the context table.

4. The method of claim 2, further comprising:
determining which of the at least one previously updated context model stored in the cache memory was most recently requested; and
writing the determined previously updated context model to the context table.

5. The method of claim 2, further comprising:
determining which of the at least one previously updated context model stored in the cache memory is least likely to be requested in the future; and
writing the determined previously updated context model to the context table.

6. The method of claim 1, further comprising:
writing the updated version of the first context model in the cache memory, wherein
the cached version of the first context model is stored at a particular location in the cache memory, and
the updated version of the first context model is written to the particular location in the cache memory.

7. The method of claim 1, further comprising:
responsive to a determination that the first context model is not stored in cache memory,
retrieving a stored version of the first context model from a context table, wherein
the context table is configured to store a plurality of context models utilized in the synchronous dual-pipelined environment; and
providing the stored version of the first context model to the first encoder, wherein the first encoder is configured to
utilize the stored version of the first context model to encode the first bin, and
update the stored version of the first context model to produce the subsequent version of the first context model.

8. The method of claim 1, further comprising:
responsive to a determination that the updated version of the first context model is not available at the respective output, retrieving the cached version of the first context model from the cache memory; and
providing the cached version of the first context model to the first encoder, wherein the first encoder is configured to
utilize the cached version of the first context model to encode the first bin, and
update the cached version of the first context model to produce the subsequent version of the first context model.

9. The method of claim 1, wherein the method is implemented in an H.264 video encoder.

10. The method of claim 1, wherein the requested first context model and the requested second context model comprise the same context model.

11. The method of claim 1, wherein the first context lookup module is configured to:
receive the first bin;
issue the first request for the first context module based on the first bin; and
output the first bin to the first encoder; and
wherein the second context lookup module is configured to:
receive a second bin;
issue the second request for the second context module based on the second bin; and
output the second bin to the second encoder.

12. The method of claim 1, the method further comprising:
determining if the second context model is stored in the cache memory;
responsive to a determination that a cached version of the second context model is stored in the cache memory, determining whether an updated version of the second context model is available at the respective output of either the first encoder or the second encoder;
responsive to a determination that the updated version of the second context model is available at the respective output, retrieving the updated version of the second context model from the respective output;
providing the updated version of the second context model to the second encoder, wherein the second encoder is configured to
utilize the updated version of the second context model to encode a second bin, and
update the updated version of the second context model to produce a subsequent version of the second context model;
receiving, at the cache memory in the second clock cycle, the subsequent version of the second context model from the output of the second encoder; and
writing the subsequent version of the second context model in the cache memory in response to the receiving the subsequent version of the second context model at the cache memory.

13. A system for managing cache memory in context-adaptive binary arithmetic coding (CABAC) implemented in a synchronous dual-pipelined environment, the system comprising:
a cache memory manager configured to:
receive, in a first clock cycle, a first request for a first context model from a first context lookup module communicatively coupled to a first encoder and a second request for a second context model from a second context lookup module communicatively coupled to a second encoder;

determine if the first context model is stored in cache memory, wherein the cache memory is configured to store at least one previously updated context model;

responsive to a determination that a cached version of the first context model is stored in the cache memory, determine whether an updated version of the context model is available at a respective output of either the first encoder or the second encoder;

responsive to a determination that the updated version of the first context model is available at the respective output, retrieve the updated version of the first context model from the respective output;

provide the updated version of the first context model to the first encoder;

receive, in a second clock cycle, a subsequent version of the first context model from the output of the first encoder; and write the subsequent version of the first context model in the cache memory in response to receipt of the subsequent version.

14. The system of claim 13, wherein the cache memory manager is further configured to:
write the subsequent version of the first context model to a context table, wherein
the cache memory is communicatively coupled to the context table,
the context table stores an older version of the first context model, and
the subsequent version of the first context model overwrites the older version of the first context model in the context table.

15. The system of claim 14, wherein the cache memory manager is further configured to:
determine which of the at least one previously updated context model stored in the cache memory was least recently updated; and
write the determined previously updated context model to the context table.

16. The system of claim 14, wherein the cache memory manager is further configured to:
determine which of the at least one previously updated context model stored in the cache memory was most recently requested; and
write the determined previously updated context model to the context table.

17. The system of claim 14, wherein the cache memory manager is further configured to:
determine which of the at least one previously updated context model stored in the cache memory is least likely to be requested in the future; and
write the determined previously updated context model to the context table.

18. The system of claim 13, wherein the cache memory manager is further configured to:
write the updated version of the first context model in the cache memory, wherein
the cached version of the first context model is stored at a particular location in cache memory, and
the updated version of the first context model is written to the particular location in the cache memory.

19. The system of claim 13, wherein the cache memory manager is further configured to:
responsive to a determination that the first context model is not stored in cache memory,
retrieve a stored version of the first context model from a context table, wherein
the context table is configured to store a plurality of context models utilized in the synchronous dual-pipelined environment; and
provide the stored version of the first context model to the first encoder.

20. The system of claim 13, wherein the cache memory manager is configured to:
responsive to a determination that the updated version of the first context model is not available at the respective output, retrieve the cached version of the first context model from the cache memory; and
provide the cached version of the first context model to the first encoder.

21. The system of claim 13, wherein the system is implemented in an H.264 video encoder.

22. The system of claim 13, wherein the requested first context model and the requested second context model comprise the same context model.

23. The system of claim 13, wherein
the cache memory manager is coupled to a selection input of a multiplexer gate,
the multiplexer gate has a first input coupled to receive a stored context model from a context table, a second input coupled to receive a cached context model from the cache memory, a third input coupled to receive a first updated context model from the output of the first encoder, and a fourth input coupled to receive a second updated context model from the output of the second encoder, and
the cache memory manager is configured to
select one of the first, second, third, and fourth inputs that receives a most recently updated version of the first context model, wherein
an output of the multiplexer gate provides the most recently updated version to an input of the first encoder.

24. A computer readable storage medium structured to store instructions executable by a processing system for managing cache memory in context-adaptive binary arithmetic coding (CABAC) implemented in a synchronous dual-pipelined environment, wherein the instructions when executed cause the processing system to:
receive, at a CABAC encoder cache memory in a first clock cycle, a first request for a first context model from a first context lookup module communicatively coupled to a first encoder and a second request for a second context model from a second context lookup module communicatively coupled to a second encoder;
determine if the first context model is stored in cache memory, wherein the cache memory is configured to store at least one previously updated context model;
responsive to a determination that a cached version of the first context model is stored in the cache memory, determine whether an updated version of the first context model is available at a respective output of either the first encoder or the second encoder;
responsive to a determination that the updated version of the first context model is available at the respective output, retrieve the updated version of the first context model from the respective output;
provide the updated version of the first context model to the first encoder; and
receive, at the cache memory in a second clock cycle, a subsequent version of the first context model from the output of the first encoder; and writing the subsequent version of the first context model in the cache memory in response to the receiving the subsequent version at the cache memory.

25. The computer readable storage medium of claim 24, the instructions when executed further causing the processing system to:

responsive to a determination that the first context model is not stored in the cache memory:
retrieve a stored version of the first context model from a context table, wherein the context table is configured to store a plurality of context models utilized in the synchronous dual-pipelined environment, and
provide the stored version of the first context model to the first encoder;

responsive to a determination that the updated version of the first context model is not available at the respective output:
retrieve the cached version of the first context model from the cache memory, and
provide the cached version of the first context model to the first encoder.

\* \* \* \* \*